UNITED STATES PATENT OFFICE.

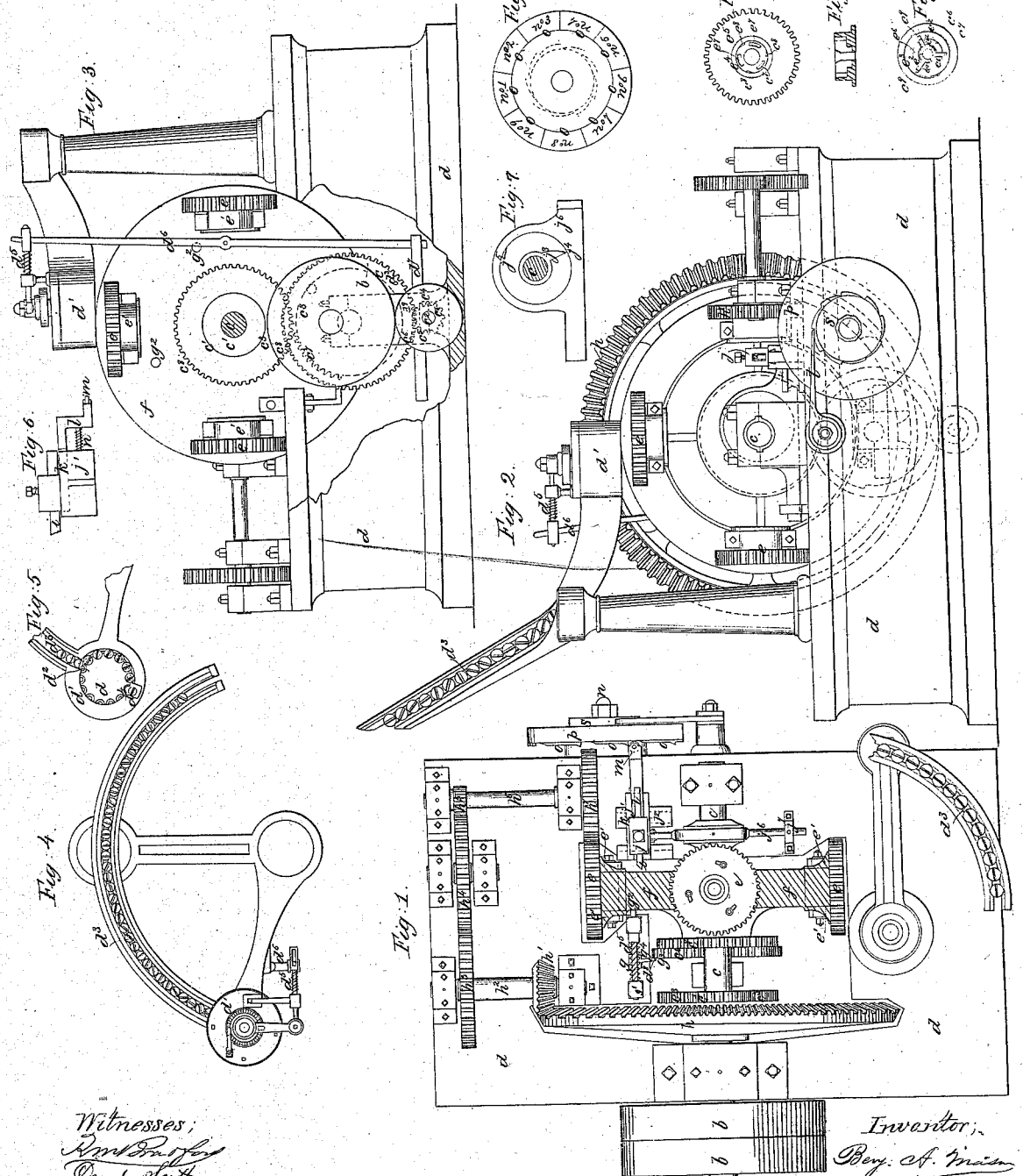

BENJAMIN A. MASON, OF NEWPORT, RHODE ISLAND, ASSIGNOR TO SARAH J. MASON, OF SAME PLACE.

IMPROVEMENT IN MACHINES FOR THREADING WOOD-SCREWS.

Specification forming part of Letters Patent No. 35,423, dated May 27, 1862.

*To all whom it may concern:*

Be it known that I, BENJAMIN A. MASON, of Newport, Rhode Island, have invented certain new and useful Improvements in Machinery for Threading Wood-Screws; and I do hereby declare that the following is a full and exact description thereof, reference being had to the accompanying drawings, and to the letters of reference thereon.

My invention consists of a machine for threading wood-screws, in which is embodied mechanism for receiving blanks and conducting them into annular chucks; mechanism for carrying the chucked blanks to a threading-tool; mechanism for cutting the thread on the blank while held in a chuck by the shank, the jaws of the chuck tightening their grip on the blank in proportion to the impinging force of the cutting-tool by reason of the resistance of the cutting-tool to the rotation of the blank; mechanism for guiding and directing the thread-cutting tool to cut the screw by a succession of light cuts from the shank to the point of the screw, and mechanism for discharging the finished screw, leaving the chuck in condition for receiving a fresh blank.

Of the drawings hereto annexed, Figure 1 is a plan or top view of the machine with the parts removed which conduct the screw-blanks to the chucks, and also with the outer rim of the wheel which carries the chucks removed. Fig. 2 is a side elevation. Fig. 3 is also a side elevation with the large gear-wheel removed, being the side opposite to that shown by Fig. 2. Fig. 4 is a top view of a raceway in which the blanks are suspended and along which they slide. Fig. 5 is a top or end view of a rotating drum or cylinder having grooves in the periphery to receive the blanks and to carry them around to be dropped each into a chuck. Fig. 6 is a side elevation of the cutter and its stock or carriage. Fig. 7 is a front elevation of the mechanism which moves the cutter-carriage in the direction of the length of the screw-blank. Fig. 8 is a detached view of the cam-plate which guides the tool for cutting the thread. Figs. 9, 10, and 11 are parts of the chuck.

Letter $a$ represents the frame of the machine; $b\ b$, tight and loose pulleys on the principal or driving shaft $c$, from which shaft directly or indirectly all the moving parts of the machine derive their motion.

The feeding mechanism, which receives the screw-blanks and conducts them to the chucks, consists of a vertical rotating grooved barrel, $d$, with its casing $d'$ communicating by the slot $d^2$ with the inclined slotted ways $d^3$, in which the screw-blanks are placed suspended by their heads, as shown in the drawings.

$d^4$ is a recess in the opposite side of the casing, which allows the screw-blanks received from the ways and carried around between the casing and the barrel in the grooves of the barrel while suspended by their heads to fall away from the grooved barrel when they reach the recess and drop through a hole in the bottom of the case into one of a series of four annular chucks, $e$, of peculiar construction, hereinafter described, which are successively brought to the feeding mechanism by the chuck-carrier $f$ to receive the blanks, and are from thence carried by the chuck-carrier to the threading mechanism.

The ratchet which operates the grooved barrel is connected by the sliding rod $d^5$ and lever $d^6$ with the sliding bar $d^7$, which is moved horizontally once at every revolution of the wheel $c^6$ by the pin $d^8$, projecting from the side of said wheel, taking against a tooth, $d^9$, on the upper side of the sliding bar $d^7$, the spring on the sliding rod $d^5$ reacting the ratchet and connections when the wheel-pin escapes the tooth on the sliding bar $d^7$. The wheel $c^6$, which thus gives motion to the mechanism for conducting the screw-blanks to the chucks at every revolution, also moves the chuck-carrier once every revolution, as hereinafter explained, to carry a chuck with its blank to the screw-threading mechanism, and both operations are so timed relatively to each other that the blank arrives at and drops through the hole in the casing of the feeding-barrel into the chuck when the chuck-carrier is at rest.

The chuck-carrier $f$ is a wheel or circular plate of metal, which sustains and carries four annular chucks, $e\ e\ e\ e$, just within the periphery, equidistant from each other and arranged to rotate in bearings $e'$, the axes of the chucks being radial lines from the axis of the chuck-carrier, so that the screw-blanks, when in the chucks, point to the axis of the chuck-carrier and are in line with its plane of motion. It is sustained by the shaft $c$ and revolves thereon, being turned at the proper time to shift the chucks successively from the feeding to the threading mechanism in the following manner: A cog-wheel, $c'$, fast to the shaft $c$, communicates motion to the shaft $c^2$ through the carrier cog-wheel $c^3$ and the cog-wheel $c^4$, fast to the shaft $c^2$. On the other end of the shaft $c^2$ is a pinion, $c^5$, which drives the cog-wheel $c^6$, to the side of which is secured a segment-wheel, $c^7$, which has on its periphery a short segment of cogs, the rest of the periphery being cut away. This cogged segment engages at every revolution with a cog-wheel, $c^5$, fast to the chuck-carrier and moves it a quarter of a circle or the distance from the feeding mechanism to the threading mechanism, and then, the segment having become disengaged, the chuck-carrier remains at rest until the threading mechanism has performed its office, when, the gearing being purposely so proportioned and timed, the cogged segment again engages the cog-wheel attached to the chuck-carrier and moves it forward another quarter of a revolution, thus carrying an empty chuck to the feeding mechanism, a chucked blank to the threading mechanism, and a finished screw to the place of discharge from the chuck at every revolution of the segment-wheel.

During the operation of the threading mechanism the chuck-carrier is held firmly by the spring-bolt $g$, which slides in bearings $g'$ on the frame of the machine and locks into a socket, $g^2$, in the chuck-carrier near each chuck. A small cam, $g^3$, on the wheel $c^6$ acts on the arm $g^4$ of the spring-bolt in time to force it back and release the chuck-carrier before the segment-wheel engages with the driving-wheel of the chuck-carrier.

The end of the spring-bolt is pressed against the side of the chuck-carrier by its spring, so as to slip into each socket successively and lock the chuck-carrier the instant it is released from the segment-wheel.

Having described the mechanism for sustaining and carrying the chucks and its mode of operation, I will now proceed to describe more particularly the construction and operation of the chucks.

The parts of the chucks are shown detached in Figs. 9, 10, and 11. Letter $e^2$, one of the parts of the chuck, is an annular plate with a ring-flange, $e^3$, on its face, which fits the ring-flange $e^4$ on the annular plate $e^5$, which forms the other member of the chuck, the two parts being held to each other by the heads of the pins $e^6$, which are screwed fast to the part $e^2$, the slots $e^7$ affording play to allow the two parts to turn on each other sufficiently to cause the cams $e^8$, fast to the part $e^5$, to move the segment-jaws $e^9$ of the chuck, which lie in a recess in the middle of the part $e^2$, and which are so arranged with relation to the cams that when the part $e^5$ is turned in one direction the cams move the segments toward the axis of the chuck for the purpose of gripping the screw-blank firmly by the shank to hold it against the action of the screw-threading tool, and when it is turned back the finished screw is released from the grasp of the segments, so that it may drop out when the chuck is turned down from the screw-threading mechanism, leaving the chuck in proper condition for receiving in its turn a fresh screw-blank when brought to the feeding mechanism. The segments are countersunk to fit the screw-head.

All the chucks have cog-teeth cut on the periphery of the part $e^5$, by which they are rotated when brought to the place of action of the threading mechanism, as follows: The large crown-wheel $h$, fast to the driving-shaft $c$, gears into the pinion-wheel $h'$ on the shaft $h^2$. On the other end of this shaft is a spur-wheel, $h^3$, which drives the carrier cog-wheel $h^4$, which gears into the pinion $h^5$ on the shaft $h^6$. On the other end of the shaft $h^6$ is a driving cog-wheel, $h^7$, common to all the chucks. As the chucks are brought successively to the threading mechanism, this driver engages with their cog-wheels, imparting to them a rapid motion. The friction of the journals of the chucks which are on the part of the chuck that contains the segments affords a slight resistance to the rotation of the chuck by the cogged periphery of the other part when it engages with the driver sufficient to turn the parts of the chuck so as to grip the screw-blank.

The pinch of the segments upon the shank of the screw is increased as soon as the rotation of the chuck is opposed by the action of the point of the screw-cutting tool upon the blank, the cams being jammed tighter against the segments by the opposing forces operating upon the opposite parts of the chuck, so that the harder the cutting-tool impinges upon the metal of the screw-blank the tighter it is held in the grip of the segmental jaws of the chuck. As the chucks are turned down from the screw-cutting mechanism, the action of the gearing releases the grip of the segments to permit the screws to drop out of the chuck.

The rotating chuck when engaged with its driving-gear constitutes a part of the screw cutting or threading mechanism, the thread being cut by rotating the screw-blank against the action of a cutting-tool sustained, moved, and directed by mechanism so as to cut the required thread by several successive cuts from the shank to the gimlet-point of the screw, each cut deepening the thread until it is finished, as follows: The cutting-tool $i$ is carried by a self-acting slide-rest, $j$, the lower sliding bed, $j'$, sliding back and forth on the slides $j^2$ in the direction of the length of the screw and parallel with the axis of the chuck, being moved by the cam $j^3$ on the shaft $c$, acting alternately on the cams $j^4$ and $j^5$ on the sliding piece $j^6$, one end of which is jointed to the sliding bed and the other end is held by and moves in a suitable bearing at $j^7$. The tool- C. Merritt,
Weather Strip.
N° 35,424.  Patented May 27, 1862.
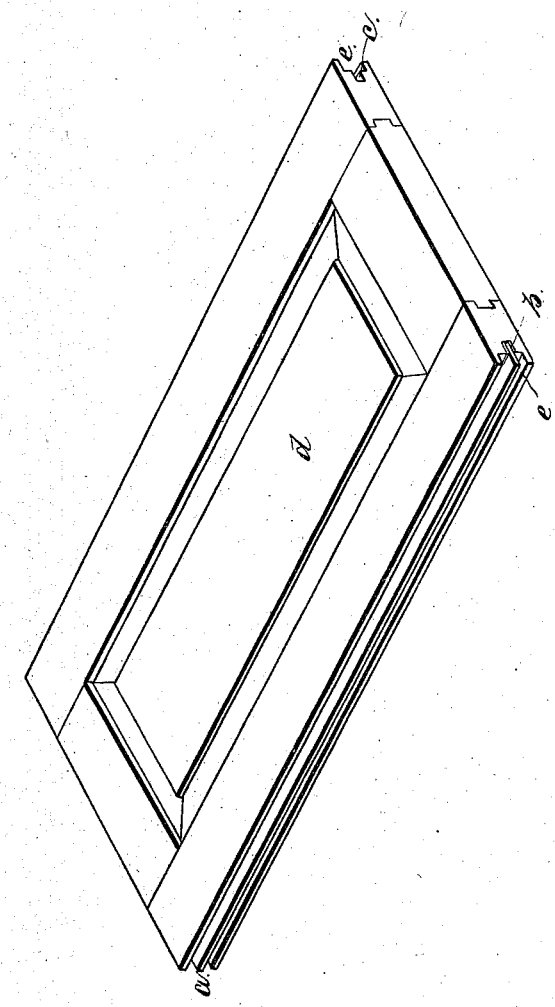
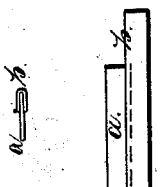
Witnesses:
C. E. Graves
J. H. Hodges
Inventor
C. Merritt
per H. T. White agt.